US010673331B2

(12) United States Patent
Lu et al.

(10) Patent No.: US 10,673,331 B2
(45) Date of Patent: Jun. 2, 2020

(54) CIRCUIT WITH REDUCED LIGHT LOAD POWER DISSIPATION AND A METHOD THEREOF

(71) Applicant: Chengdu Monolithic Power Systems Co. Ltd., Chengdu (CN)

(72) Inventors: Wenbin Lu, Hangzhou (CN); Lei Miao, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 0 days.

(21) Appl. No.: 16/297,491

(22) Filed: Mar. 8, 2019

(65) Prior Publication Data
US 2019/0305677 A1   Oct. 3, 2019

(30) Foreign Application Priority Data

Mar. 30, 2018 (CN) .......................... 2018 1 0286989

(51) Int. Cl.
*H02M 3/156* (2006.01)
*H02M 1/10* (2006.01)
*H02M 1/42* (2007.01)
*H02M 5/22* (2006.01)

(52) U.S. Cl.
CPC .............. *H02M 3/156* (2013.01); *H02M 1/10* (2013.01); *H02M 1/4208* (2013.01); *H02M 5/22* (2013.01); *H02M 2003/1566* (2013.01)

(58) Field of Classification Search
CPC ...... H02M 3/156; H02M 1/10; H02M 1/4208; H02M 5/22; H02M 2003/1566
See application file for complete search history.

(56) References Cited

U.S. PATENT DOCUMENTS

| 2013/0301310 | A1 | 11/2013 | Wang et al. | |
|---|---|---|---|---|
| 2015/0077078 | A1* | 3/2015 | Hsu | H02M 3/156 323/282 |
| 2015/0100174 | A1* | 4/2015 | Li | H02M 3/156 700/298 |
| 2016/0105095 | A1* | 4/2016 | Mayell | H02M 1/4225 323/205 |
| 2017/0077812 | A1* | 3/2017 | Guo | H02M 3/158 |
| 2018/0159433 | A1* | 6/2018 | Oe | H02M 3/33523 |

* cited by examiner

*Primary Examiner* — Jue Zhang
*Assistant Examiner* — Lakaisha Jackson
(74) *Attorney, Agent, or Firm* — Perkins Coie LLP

(57) ABSTRACT

A feedback block used with an isolated switching converter, having: a variable resistance circuit receiving a resistance control signal and having an equivalent resistance in proportional to a duty cycle of the resistance control signal; and a resistance control circuit, configured to provide the resistance control signal based on a load of the isolated switching converter; wherein the duty cycle of the resistance control signal varies in response to the load of the isolated switching converter.

18 Claims, 5 Drawing Sheets

CIRCUIT WITH REDUCED LIGHT LOAD POWER DISSIPATION AND A METHOD THEREOF

CROSS-REFERENCE TO RELATED APPLICATIONS

This application claims priority to and the benefit of Chinese Patent Application No. 201810286989.5, filed on Mar. 30, 2018, which is incorporated herein by reference in its entirety.

FIELD

The present invention relates generally to electronic circuits, and more particularly but not exclusively to switching converters.

BACKGROUND

FIG. 1 schematically shows a prior art isolated switching converter 10 comprising a primary side circuit 101 and a secondary side circuit 103 coupled via a couple device 102, e.g., a transformer. The isolated switching converter 10 receives an input voltage Vin by the primary side circuit 101 and provides an output Voltage Vout by the secondary side circuit 103. However, information of the output voltage Vout needs to be fed back from the secondary side circuit 103 to the primary side circuit 101 to control the power conversion. In the prior art isolated switching converter 10 in FIG. 1, an opto-coupler 106 is adopted to feedback the output voltage and to realize electrical isolation between the primary side circuit 101 and the secondary side circuit 103 to protect the user on the secondary side circuit 103 from relatively high voltages on the primary side circuit 101 (such as a high input voltage Vin). The output voltage Vout of the switching converter 10 is provided to a photosensitive diode D0 of the opto-coupler 106 via a secondary feedback circuit 104, and is then further provided to a photosensitive transistor T0 of the opto-coupler 106 in form of an optical current Iopto, wherein the optical current Iopto is provided to the primary side circuit 101 to control the power conversion. TL431 shown in FIG. 1 is a three-terminal adjustable shunt regulator produced by Texas Instruments Inc. (TI), and is widely adopted in the feedback circuits of the isolated switching converters.

FIG. 2 shows a prior art relation curve that the optical current Iopto varies with an output power Pout of an isolated switching converter. As can be seen from FIG. 2, the lower the output power Pout, the larger the optical current Iopto, which means that the optical current Iopto is relatively large under light load or no load condition, and reaches to the maximum when the output power Pout reaches its minimum. This characteristic seriously hurts the light/no load efficiency of the isolated switching converter.

So a circuit to improve light/no load efficiency by decreasing the optical current Iopto under light/no load condition is necessary.

SUMMARY

It is an object of the present invention to disclose a way to decrease the optical current under light/no load condition.

In accomplishing the above and other objects, there has been provided, in accordance with an embodiment of the present invention, a feedback block, used with an isolated switching converter, comprising: a variable resistance circuit, coupled between a control voltage supply and a feedback terminal, the variable resistance circuit receiving a resistance control signal and having an equivalent resistance in proportional to a duty cycle of the resistance control signal; and a resistance control circuit, configured to provide the resistance control signal based on a load of the isolated switching converter; wherein the duty cycle of the resistance control signal increases gradually from a minimum value to a maximum value after the load of the isolated switching converter decreases to a load threshold; and the duty cycle of the resistance control signal decreases gradually from the maximum value to the minimum value after the load of the isolated switching converter increases to the load threshold.

In accomplishing the above and other objects, there has been provided, in accordance with an embodiment of the present invention, an isolated switching converter, comprising: a power block, configured to receive a bus voltage and a switching signal, wherein the power block is controlled to be on and off by the switching signal to deliver an output power to a load, and meanwhile to convert the bus voltage to an output voltage; a control block, configured to provide the switching signal based on a feedback voltage at the feedback terminal; and a feedback block configured to provide the feedback voltage, wherein the feedback block comprises: a variable resistance circuit, coupled between a control voltage supply and the feedback terminal, the variable resistance circuit receiving a resistance control signal and having an equivalent resistance in proportional to a duty cycle of the resistance control signal; and a resistance control circuit, configured to provide the resistance control signal based on a load of the isolated switching converter; wherein the duty cycle of the resistance control signal increases gradually from a minimum value to a maximum value after the load of the isolated switching converter decreases to a load threshold; and the duty cycle of the resistance control signal decreases gradually from the maximum value to the minimum value after the load of the isolated switching converter increases to the load threshold.

In accomplishing the above and other objects, there has been provided, in accordance with an embodiment of the present invention, a method for controlling a feedback block of an isolated switching converter, wherein the isolated switching converter comprises a control block, and a power block controlled by a switching signal, the method comprising: providing a resistance control signal with switching cycle periods based on a load of the isolated switching converter; providing a feedback voltage by flowing an optical current through an variable resistance controlled by the resistance control signal, wherein the optical current is in proportional to the output voltage of the isolated switching converter; wherein the variable resistance increases when a load decreases to be lower than a load threshold and decreases when the load increases to be higher than the load threshold.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
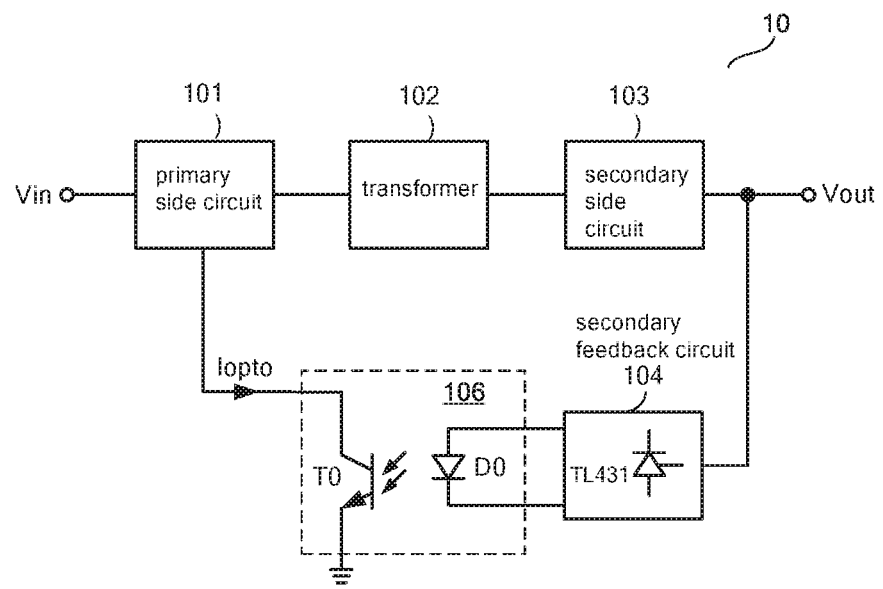
FIG. 1 schematically shows a prior art isolated switching converter 10 comprising a primary side circuit 101 and a secondary side circuit 103 coupled via a couple device 102.
Figure 2:
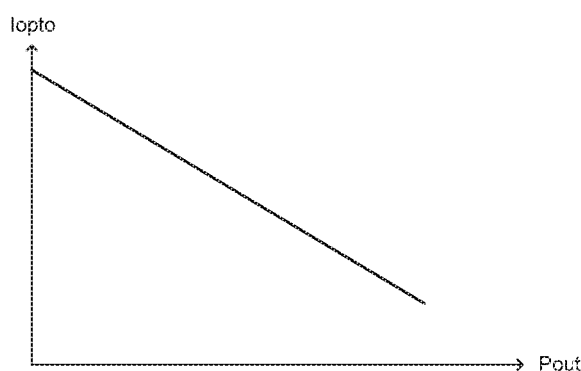
FIG. 2 shows a prior art relation curve that the optical current Iopto varies with the output power Pout and of an isolated switching converter.
Figure 3:
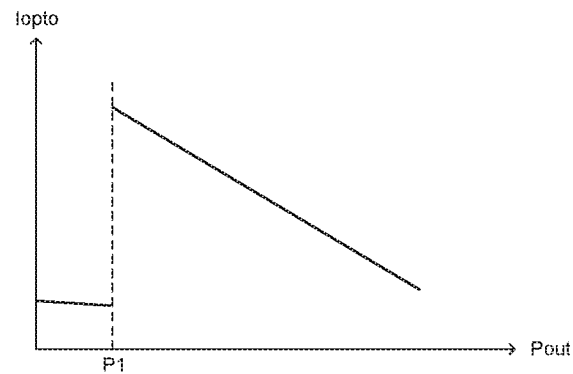
FIG. 3 shows a relation curve that the optical current Iopto varies with the output power Pout in an isolated switching converter in accordance with an embodiment of the present invention.

FIG. 3 shows a relation curve that the optical current Iopto varies with the output power Pout in an isolated switching converter in accordance with an embodiment of the present invention. As shown in FIG. 3, the optical current Iopto is inversely proportional to the output power Pout when the output power Pout is larger than a power threshold P1, and decreases to a very low level when the output power Pout is lower than the power threshold P1. In other words, when the isolated switching converter of the present invention works under an extreme light load condition, the optical current Iopto deceases significantly to a very low level, so as to decease the light/no load power dissipation. The power threshold P1 defines the extreme light load condition in the present invention, which is to say, the isolated switching converter works under the extreme light load condition when the output power Pout is lower than the power threshold P1 in the present invention. In an example of the present invention, the extreme light load condition may be different from the light load condition in the prior art, for the power threshold P1 may be lower than a power threshold that define a light load condition of a switching converter in the prior art.

In the example shown in FIG. 3, the extreme light load condition of the present invention is close to a no load condition of the switching converter. When the output power Pout is larger than the threshold P1, the optical current Iopto is approximately 1 mA, and when the output power Pout is lower than the threshold P1, the optical current Iopto is under 100 μA.

However, the extreme light load condition may be the same with the prior art light load condition in some other embodiments. Persons of ordinary skill in the art could choose the value of the threshold P1 according to the application specs after learning the present invention.

Figure 4:
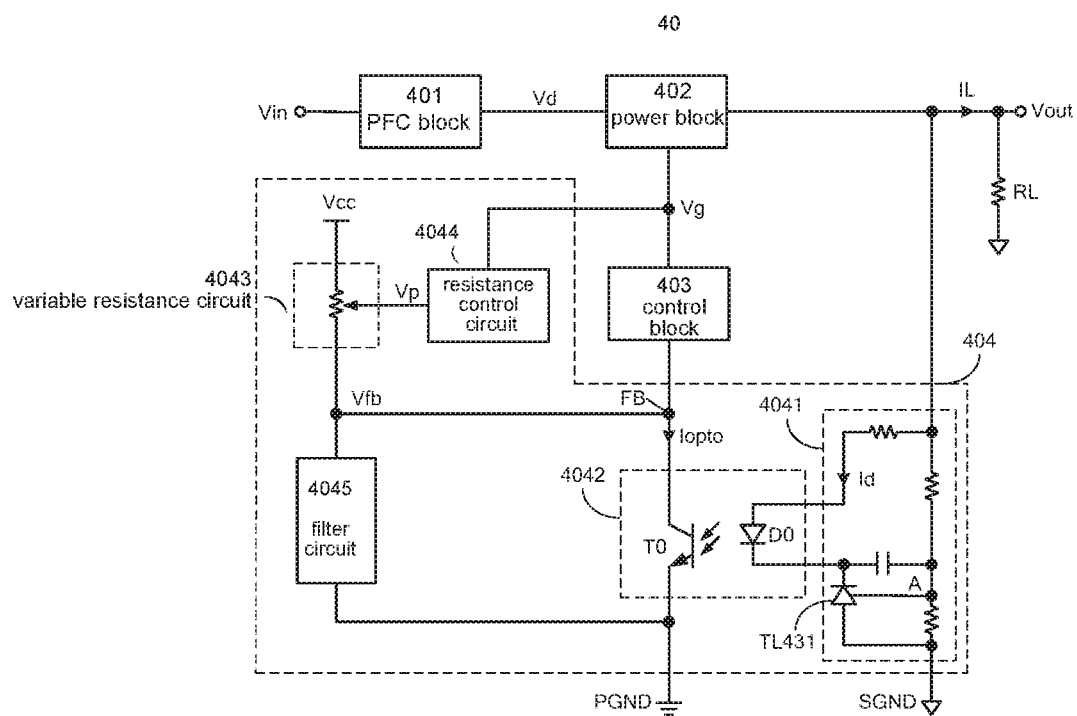
FIG. 4 schematically shows an isolated switching converter 40 in accordance with an embodiment of the present invention.

FIG. 4 schematically shows an isolated switching converter 40 in accordance with an embodiment of the present invention. As shown in FIG. 4, the isolated switching converter 40 comprises a PFC block 401, a power block 402, a control block 403 and a feedback block 404. The PFC block 401 receives an input voltage Vin, and converts the input voltage Vin to a bus voltage Vd. The power block 402 receives the bus voltage Vd and converts the bus voltage Vd to the output voltage Vout which is then supplied to a load RL under control of a switching signal Vg provided by the control block 403. The PFC block 401 and the control block 403 may be integrated together in a primary side chip of the isolated switching converter 40.

In the example of FIG. 4, the input voltage Vin maybe a rectified voltage of an AC voltage, and the PFC block 401 is adopted to improve the power factor. When the input voltage Vin is a constant DC voltage, the PFC block 401 could be omitted in other embodiments.

In one embodiment, the power block 402 comprises at least one energy storage component and at least one power switch. The energy storage component may be a transformer or an inductor. In one embodiment, the power block 402 comprises a power switch controlled to be on and off by the switching signal Vg. In another embodiment, the power block 402 comprises a first power switch and a second power switch, wherein the first power switch is controlled to be on and off by the switching signal Vg and the second power switch is turned on and off alternately with the first power switch. The power switches may be controllable switches, e.g., MOSFET (Metal Oxide Semiconductor Field Effect Transistor). In the present invention, the power block 402 is defined to be on when the power block 402 is connected to the input power, e.g., the bus voltage Vd, and is defined to be off when the power block 402 is disconnected from the input power.

The control block 403 is configured to provide the switching signal Vg to control the power block 402. When the power block 402 has LLC topology, the control block 403 comprises a corresponding LLC control circuit. When the power block 402 has Flyback topology, the control block 403 comprises a corresponding Flyback control circuit, etc.

The feedback block 404 comprises a secondary feedback network 4041, an opto-coupler 4042, a variable resistance circuit 4043, a resistance control circuit 4044 and a filter circuit 4045 as shown in FIG. 4. The secondary feedback network 4041 is coupled between the output voltage Vout and a secondary ground reference SGND to receive the output voltage Vout, and to convert the output voltage Vout to a current Id flowing through a photosensitive diode D0 of the opto-coupler 4042, wherein the current Id is further converted to the optical current Iopto flowing through a photosensitive transistor T0 of the opto-coupler 4042, which is provided to the variable resistance circuit 4043 to establish a feedback voltage Vfb. The control block 403 receives the feedback voltage Vfb and generates the switching signal Vg based on the feedback voltage Vfb. The filter circuit 4045 is coupled between a feedback terminal FB and a primary ground reference PGND to filter the feedback voltage Vfb at the feedback terminal FB, i.e., to decrease the voltage fluctuation caused by the resistance variation of the variable resistance circuit 4043. The variable resistance circuit 4043 is coupled between a control voltage supply Vcc and the feedback terminal FB, and may comprise an adjustable resistor controlled by the resistance control signal Vp provided by the resistance control circuit 4044, wherein the control voltage supply Vcc may be an internal generated voltage or an external voltage provided to the primary side chip of the isolated switching converter 40.

The opto-coupler 4042 comprises: the photosensitive diode D0, coupled to the secondary feedback network 4041 which converts the output voltage Vout to the current Id flowing through the photosensitive diode D0; and the photosensitive transistor T0, coupled between the feedback terminal FB and the primary ground reference PGND, wherein the photosensitive transistor T0 provides the optical current Iopto to the variable resistance circuit 4043 to establish the feedback voltage Vfb.

The secondary feedback network 4041 comprises resistors, capacitor and TL431 coupled as shown in FIG. 4, wherein TL431 is a three-terminal adjustable shunt regulator produced by TI (Texas Instruments), which is widely adopted in feedback circuits. During load transient, the output voltage Vout increases as the load decreases, followed by the increase of a voltage VA at a connection node A. As a result, the current flowing through TL431, i.e., the current Id flowing through the photosensitive diode D0 increases according to the characteristic of TL431. Then, the optical current Iopto increases and the feedback voltage Vfb decreases, so as to control the power block 402 to deliver less power to the load RL. The secondary feedback network 4041 in FIG. 4 is known to persons of ordinary skill in the art, and is not described for brevity here. It should be understood that, the present invention could be applied with any converter that regulating load by adjusting the optical current Iopto.

In order to make the optical current Iopto be independent from the load variation, the resistance control signal Vp controls the variable resistance circuit 4043 to increase the equivalent resistance Requ of the variable resistance circuit 4043 when the extreme light load condition is met. On the contrary, the resistance control signal Vp controls the variable resistance circuit 4043 to decrease the equivalent resistance Requ when the isolated switching converter 40 exits the extreme light load condition.

In the example of FIG. 4, the resistance control circuit 4044 generates the resistance control signal Vp based on the switching signal Vg.

Figure 5:
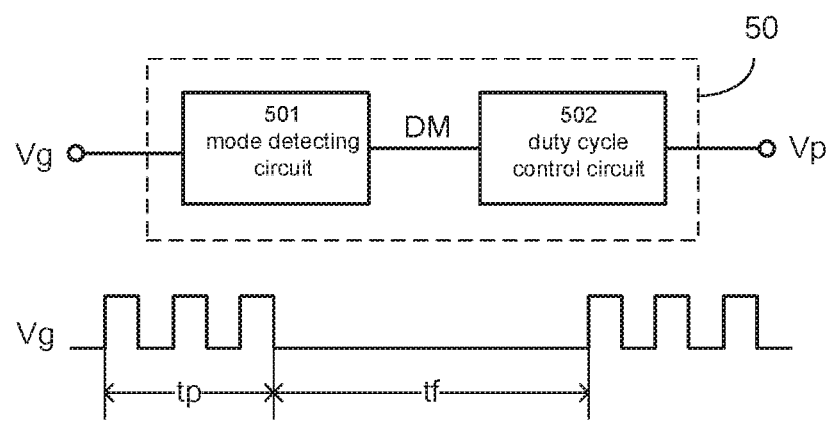
FIG. 5 schematically shows a resistance control circuit 50 in accordance with an embodiment of the present invention.

FIG. 5 schematically shows a resistance control circuit 50 in accordance with an embodiment of the present invention. The resistance control circuit 50 may be applied to the feedback block 404 in FIG. 4. The resistance control circuit 50 comprises a mode detecting circuit 501 and a duty cycle control circuit 502. The mode detecting circuit 501 receives the switching signal Vg, and generates a mode detecting signal DM which indicates if the isolated switching converter 40 enters the extreme light load condition or not, based on the switching signal Vg. The duty cycle control signal 502 receives the mode detecting signal DM, and generates the resistance control signal Vp based on the mode detecting signal DM, wherein the resistance control signal Vp is a pulse signal with switching cycles and variable duty cycles. The duty cycle of the resistance control signal Vp is defined as a fraction of the pulse in a switching cycle period, and the switching cycle period is defined as a time period consisting of a pulse time period and an adjacent non-pulse time period.

When the mode detecting signal DM indicates that the isolated switching converter 40 enters the extreme light load condition, the duty cycle of the resistance control signal Vp increases from a minimum value to a maximum value, and keeps unchanged thereafter. When the mode detecting signal DM indicates that the isolated switching converter exits the extreme light load condition, the duty cycle of the resistance control signal Vp decreases from the maximum value to the minimum value, and keeps unchanged thereafter.

In one embodiment, the isolated switching converter 40 comprises a LLC topology. During a normal operation, a duty cycle of the switching signal Vg is 50% for a LLC converter as known by persons of ordinary kill in the art. The isolated switching converter 40 is under a burst mode when the load is lower than a preset value, which means that the switching signal Vg has an active time period tp and an inactive time period tf between two active time periods as shown in FIG. 5. In one embodiment, the extreme light load condition is defined as a burst duty cycle tp/(tp+tf) of the switching signal Vg being lower than a load threshold K, e.g., 10% for several successive times, and the mode detecting signal DM has a first voltage level for the extreme light load condition, and has a second voltage level otherwise. When the burst duty cycle of the switching signal Vg is around the load threshold K, the mode detecting signal DM may be changing frequently. To avoid such kind of situation, the mode detecting signal DM flips only when extreme load conditions are detected or are not detected for several successive times in some embodiments.

The duty cycle control circuit 502 receives the mode detecting signal DM, and provides the resistance control signal Vp based thereon, wherein when the mode detecting signal DM indicates that the isolated switching converter 40 is not under the extreme light load condition, the duty cycle control circuit 502 provides the resistance control signal Vp with the minimum value (e.g., 0). When the mode detecting signal DM flips and indicates that the isolated switching converter 40 enters the extreme light load condition, the duty cycle control circuit 502 provides the resistance control signal Vp with an increasing duty cycle, and the duty cycle of the resistance control signal Vp keeps unchanged after reaches the maximum value (e.g., 100%). When the mode detecting signal DM flips again and indicates that the isolated switching converter 40 exits the light load condition, the duty cycle control circuit 502 provides the resistance control signal Vp with a decreasing duty cycle, and the duty cycle of the resistance control signal Vp keeps unchanged after reaches the minimum value.

In some embodiments, the load threshold K determining the extreme light load condition may comprise a first value K1 and a second value K2, so as to set a hysteresis window. And if there is a hysteresis window to determine the load condition, detecting several successive times of the burst duty cycle of the switching signal Vg is not needed.

In one embodiment, the first voltage level is high voltage level, and the second voltage level is low voltage level. It should be understood that the voltage level of a signal may be changed according to the application. As long as the circuits and the signals perform the similar functions, the sprite of the present invention is not distracted.

It should be understood, when the isolated switching converter 40 comprises a different topology, the switching signal Vg may be detected in a different way to determine the load. For example, when the isolated switching converter 40 comprises a typical constant frequency switching converter, the duty cycle of the switching signal Vg will decrease after the load decreases. In that case, detecting the duty cycle of the switching signal Vg for several successive switching cycles could determine if the switching converter is under the extreme light load condition or not.

Furthermore, detecting the duty cycle of the switching signal Vg is not the only way to determine the load of the isolated switching converter. In other embodiments, the load of the isolated switching converter may be determined by detecting an off time period of the power block 402. For example, when the isolated switching converter 40 comprises a constant on time control switching converter, detecting the off time period of the power block 402 or the duty cycle of the switching signal Vg for several successive switching cycles could determine if the switching converter is under the extreme light load condition or not. Similarly, when the isolated switching converter 40 comprises a constant off time control switching converter, detecting the on time period of the power block 402 or the duty cycle of the switching signal Vg for several successive switching cycles could determine if the switching converter is under the extreme light load condition or not. Any technique detecting the duty cycle of the switching signal Vg, the on/off time period of the power block 402 could be used with the present invention.

Persons of ordinary skill may implement detail circuits for the mode detecting circuit 501 and the duty cycle control circuit 502 after learning the above described technology. For example, with the guidance of the present invention, the mode detecting circuit 501 and the duty cycle control circuit 502 could be implemented by digital circuits generated by describing the operation of the circuits in hardware description language, e.g., VHDL (Very-High-Speed-Integrated-Circuit Hardware Description Language) and Verilog.

Figure 6:
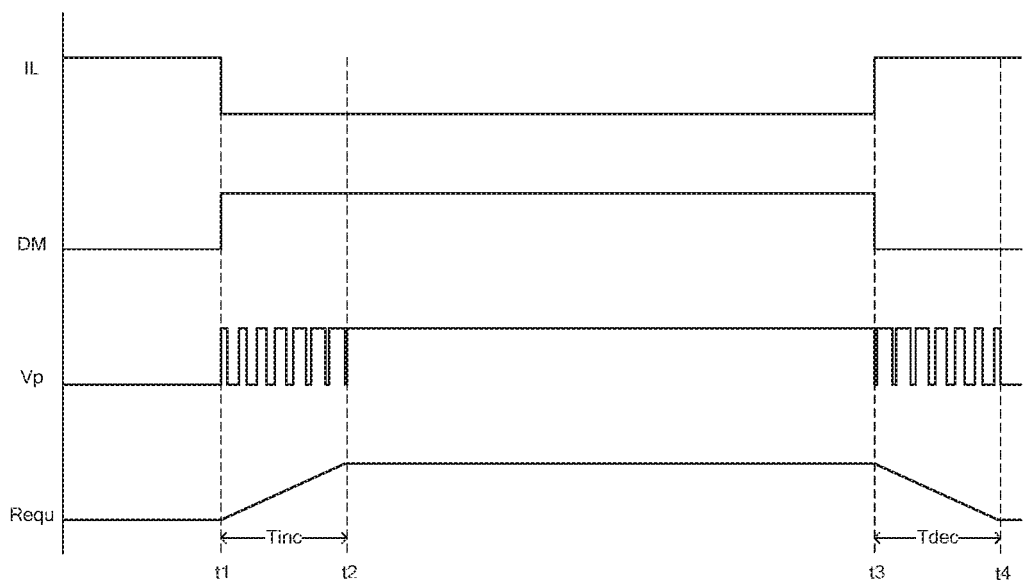
FIG. 6 shows signal waveforms of the isolated switching converter 40 in accordance with an embodiment of the present invention.

FIG. 6 shows signal waveforms of the isolated switching converter 40 in accordance with an embodiment of the present invention. As shown in FIG. 6, at time t1, a negative load transient happens (load decreases), and the load current IL decreases accordingly, the isolated switching converter 40 enters the extreme light load condition. As a result, the mode detecting signal DM flips from the low voltage level to the high voltage level, and then the duty cycle of the resistance control signal Vp increases from 0 to 100% in a time period Tinc between time t1 and t2, and remains unchanged afterwards. Meanwhile, the equivalent resistance Requ of the variable resistance circuit 4043 is controlled by the resistance control signal Vp to increase from a minimum value to a maximum value in the time period Tinc. At time t3, positive load transient happens, and the load current IL increases accordingly, the isolated switching converter 40 exits the extreme light load condition. As a result, the mode detecting signal DM flips from the high voltage level to the low voltage level, and the duty cycle of the resistance control signal Vp decreases from 100% to 0 in a time period Tdec between time t3 and t4, and remains unchanged afterwards. Meanwhile, the equivalent resistance Requ of the variable resistance circuit 4043 is controlled by the resistance control signal Vp to decrease from the maximum value to the minimum value in the time period Tdec. The maximum value and the minimum value of the equivalent resistance Requ of the variable resistance circuit 4043, and the time periods Tinc and Tdec could be preset according to the application requirements. The maximum value and the minimum value of the equivalent resistance Requ of the variable resistance circuit 4043 are related to the optical current Iopto. And generally, the longer the time periods Tinc and Tdec, the less voltage fluctuation the output voltage Vout has. But if the time periods Tinc and Tdec are too long, the efficiency of the isolated switching converter 40 may be hurt.

Figure 7:
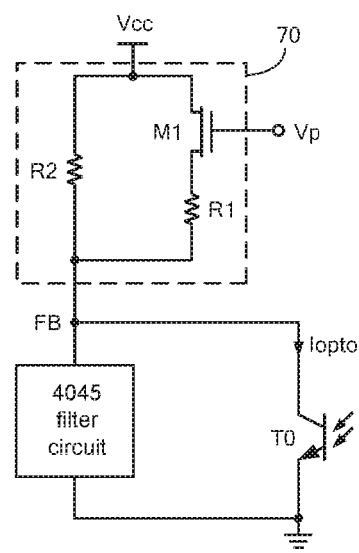
FIG. 7 schematically shows a variable resistance circuit 70 in accordance with an embodiment of the present invention.

FIG. 7 schematically shows a variable resistance circuit 70 in accordance with an embodiment of the present invention. The variable resistance circuit 70 could be used with the feedback block 404 in FIG. 4. As shown in FIG. 7, the variable resistance circuit 70 comprises: a first resistor R1 and a first switch S1, coupled in series between the control voltage supply Vcc and the feedback terminal FB; and a second resistor R2, coupled between the control voltage supply Vcc and the feedback terminal FB; wherein the first switch S1 has a control terminal configured to receive the resistance control signal Vp and is turned on and off to regulate the equivalent resistance Requ1 of the variable resistance circuit 70.

The equivalent resistance Requ1 of the variable resistance circuit 70 is $$\left(\frac{1}{1-D1}R1\right)//R2,$$

wherein D1 represents the duty cycle of the resistance control signal Vp. When D1 equals 0, the first switch S1 keeps on, and the equivalent resistance Requ1 of the variable resistance circuit 70 is R1//R2. When D1 equals 1, the first switch S1 keeps off, and the equivalent resistance Requ1 of the variable resistance circuit 70 is R2. When D1 varies from 0 to 1, the equivalent resistance Requ1 of the variable resistance circuit 70 varies from R1//R2 to R2.

Figure 8:
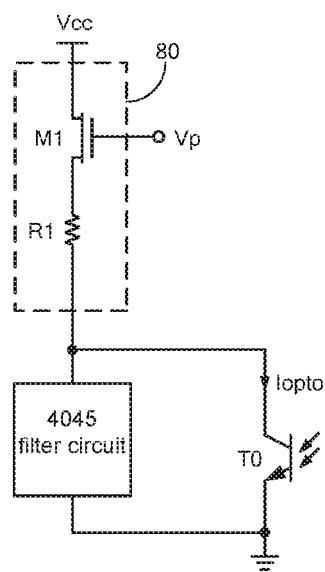
FIG. 8 schematically shows a variable resistance circuit 80 in accordance with an embodiment of the present invention.

FIG. 8 schematically shows a variable resistance circuit 80 in accordance with an embodiment of the present invention. The variable resistance circuit 80 could be used with the feedback block 404 in FIG. 4. As shown in FIG. 8, the variable resistance circuit 80 comprises: the first resistor R1 and the first switch S1, coupled between the control voltage supply Vcc and the feedback terminal FB, wherein the first switch S1 has the control terminal configured to receive the resistance control signal Vp, and is turned on and off to regulate the equivalent resistance Requ2 of the variable resistance circuit 80.

The equivalent resistance Requ2 of the variable resistance circuit 80 is R1/(1−D1), wherein D1 represents the duty cycle of the resistance control signal Vp. When D1 equals 0, the first switch S1 keeps on, and the equivalent resistance Requ2 of the variable resistance circuit 80 is R1. When D1 equals 1, the first switch S1 keeps off, and the equivalent resistance Requ1 is considered to be infinite. In some embodiments, the duty cycle of the resistance control signal Vp has the minimum value being larger than 0, and has the maximum value being smaller than 1, and the equivalent resistance Requ2 of the variable resistance circuit 80 could be calculated following the above equation R1/(1−D1). When D1 varies from 0 to 1, the equivalent resistance Requ2 of the variable resistance circuit 80 varies from R1 to infinite.

Figure 9:
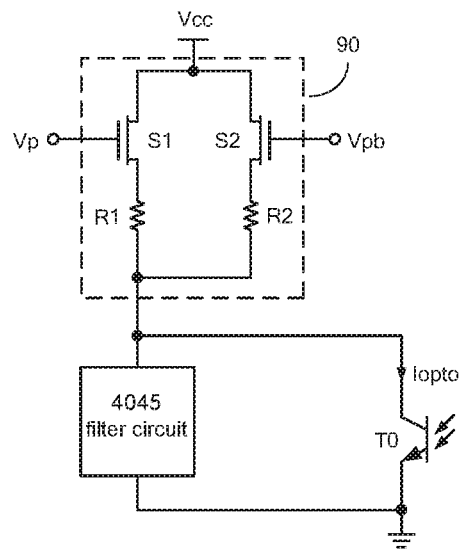
FIG. 9 schematically shows a variable resistance circuit 90 in accordance with an embodiment of the present invention.

FIG. 9 schematically shows a variable resistance circuit 90 in accordance with an embodiment of the present invention. The variable resistance circuit 90 could be used with the feedback block 404 in FIG. 4. As shown in FIG. 9, the variable resistance circuit 90 comprises: a first resistor R1 and a first switch S1, coupled in series between the control voltage supply Vcc and the feedback terminal FB, wherein the first switch S1 has a control terminal configured to receive the resistance control signal Vp; and a second resistor R2 and a second switch S2, coupled in series between the control voltage supply Vcc and the feedback terminal FB, wherein the second switch S2 has a control terminal configured to receive an reverse signal of the resistance control signal Vp; wherein the first switch S1 and the second switch S2 are turned on and off alternately to regulate the equivalent resistance Requ3 of the variable resistance circuit 90.

The first switch S1 and the second switch S2 are turned on and off alternately. The equivalent resistance Requ3 of the variable resistance circuit 90 is $$\left(\frac{1}{1-D1}R1\right)//(1/D1*R2),$$

wherein D1 represents the duty cycle of the resistance control signal Vp. When D1 equals 0, the first switch S1 keeps on while the second switch S2 keeps off, and the equivalent resistance Requ3 of the variable resistance circuit 90 is R1. When D1 equals 1, the first switch S1 keeps off while the second switch S2 keeps on, and the equivalent resistance Requ3 of the variable resistance circuit 90 is R2. When D1 varies from 0 to 1, the equivalent resistance Requ3 of the variable resistance circuit 90 varies from R1 to R2. In one embodiment, the resistance of R1 is lower than the resistance of R2.

Figure 10:
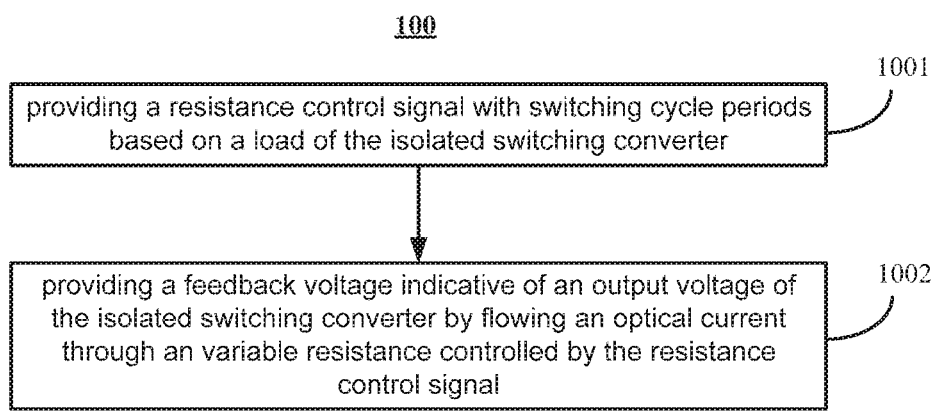
FIG. 10 shows a flow chat of a method 100 for controlling a feedback block in an isolated switching converter.

FIG. 10 shows a flow chat of a method 100 for controlling a feedback block in an isolated switching converter. The isolated switching converter may comprise a control block, a power block and a feedback block. A switching signal provided by the control block controls the power block to convert an input power to an output power. The feedback block feeds back an output voltage from a secondary side circuit and generates a feedback voltage to be provided to a primary side circuit of the isolated switching converter. The feedback block comprises: an opto-coupler providing an optical current corresponding to the output voltage; and a variable resistance circuit coupled in series to the opto-coupler to convert the optical current to the feedback voltage. The method 100 comprises: step 1001, providing a resistance control signal with switching cycle periods based on a load of the isolated switching converter; and step 1002, providing a feedback voltage by flowing an optical current through an variable resistance controlled by the resistance control signal, wherein the optical current is in proportional to the output voltage of the isolated switching converter; wherein the variable resistance increases when a load decreases to be lower than a load threshold and decreases when the load increases to be higher than the load threshold.

In one embodiment, the variable resistance is generated by a variable resistance circuit, and the variable resistance circuit comprises: a first resistor controlled by the resistance control signal to be serially coupled to a photosensitive transistor providing the optical current; and a second resistor serially coupled to the photosensitive transistor; wherein a voltage at a connection node of the first resistor, the second resistor and the photosensitive transistor is filtered and is provided as the feedback voltage.

In one embodiment, the variable resistance is generated by a variable resistance circuit, and the variable resistance circuit comprises: a resistor controlled by the resistance control signal to be serially coupled to a photosensitive transistor providing the optical current, wherein a voltage at a connection node of the resistor and the photosensitive transistor is filtered and is provided as the feedback voltage.

In one embodiment, the variable resistance is generated by a variable resistance circuit, and the variable resistance circuit comprises: a first resistor controlled by a resistance control signal to be serially coupled to a photosensitive transistor providing the optical current; and a second resistor controlled by a reversed signal of the resistance control signal to be serially coupled to the photosensitive transistor; wherein a voltage at a connection node of the first resistor, the second resistor and the photosensitive transistor is filtered and is provided as the feedback voltage.

In one embodiment, the step 1001 comprises: determining the load of the isolated switching converter by detecting the switching signal; increasing a duty cycle of the resistance control signal gradually after the load decreases to be lower than the load threshold; and decreasing the duty cycle of the resistance control signal gradually after the load increases to be higher than the load threshold; wherein the variable resistance is in proportional to the duty cycle of the resistance control signal.

In one embodiment, detecting the switching signal comprises: detecting a burst duty cycle of the switching signal, wherein the burst duty cycle is defined as a ratio of an active time period to a sum of the active time period and a adjacent non-active time period of the switching signal.

In one embodiment, detecting the switching signal comprises: detecting a duty cycle of the switching signal, wherein the duty cycle of the switching signal is defined as a ratio of an on time period to a switching cycle period of the switching signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A feedback block, used with an isolated switching converter, comprising:
   a variable resistance circuit, coupled between a control voltage supply and a feedback terminal, the variable resistance circuit receiving a resistance control signal and having an equivalent resistance in proportional to a duty cycle of the resistance control signal; and
   a resistance control circuit, configured to provide the resistance control signal based on a load of the isolated switching converter; wherein
   the duty cycle of the resistance control signal increases gradually from a minimum value to a maximum value after the load of the isolated switching converter decreases to a load threshold; and
   the duty cycle of the resistance control signal decreases gradually from the maximum value to the minimum value after the load of the isolated switching converter increases to the load threshold.

2. The feedback block of claim 1, further comprising an opto-coupler, wherein the opto-coupler comprises:
   a photosensitive diode, coupled with a secondary feedback network, wherein the secondary feedback network converts an output voltage of the isolated switching converter to a current flowing through the photosensitive diode; and
   a photosensitive transistor, coupled between the feedback terminal and a primary ground reference, the photosensitive transistor providing an optical current to the variable resistance circuit in response to the current flowing through the photosensitive diode.

3. The feedback block of claim 1, further comprising:
a filter circuit, coupled between the feedback terminal and a primary ground reference, wherein the filter circuit filters a voltage at the feedback terminal to provide a feedback voltage indicative of an output voltage of the isolated switching converter.

4. The feedback block of claim 1, wherein the variable resistance circuit comprises:
a first resistor and a first switch, coupled in series between the control voltage supply and the feedback terminal; and
a second resistor, coupled between the control voltage supply and the feedback terminal;
wherein the first switch has a control terminal configured to receive the resistance control signal, and is turned on and off to regulate the equivalent resistance of the variable resistance circuit.

5. The feedback block of claim 1, wherein the variable resistance circuit comprises:
a first resistor and a first switch, coupled in series between the control voltage supply and the feedback terminal, wherein the first switch has a control terminal configured to receive the resistance control signal, and is turned on and off to regulate the equivalent resistance of the variable resistance circuit.

6. The feedback block of claim 1, wherein the variable resistance circuit comprises:
a first resistor and a first switch, coupled in series between the control voltage supply and the feedback terminal, wherein the first switch has a control terminal configured to receive the resistance control signal; and
a second resistor and a second switch, coupled in series between the control voltage supply and the feedback terminal, wherein the second switch has a control terminal configured to receive a reverse signal of the resistance control signal; wherein
the first switch and the second switch are turned on and off alternately to regulate the equivalent resistance of the variable resistance circuit.

7. The feedback block of claim 1, wherein the resistance control circuit comprises:
a mode detecting circuit, configured to provide a mode detecting signal based on a switching signal for controlling a power block of the isolated switching converter; and
a duty cycle control circuit, configured to provide the resistance control signal based on the mode detecting signal; wherein,
the mode detecting signal flips from a first voltage level to a second voltage level when a burst duty cycle of the switching signal decreases to be lower than a burst duty cycle threshold; and
the mode detecting signal flips from the second voltage level to the first voltage level when the burst duty cycle of the switching signal increases to be higher than the burst duty cycle threshold;
wherein the switching signal is a pulse signal, and the burst duty cycle is defined as a ratio of an active time period to a sum of the active time period and an adjacent non-active time period of the switching signal.

8. The feedback block of claim 1, wherein the resistance control circuit comprises:
a mode detecting circuit, configured to provide a mode detecting signal based on a switching signal for controlling a power block of the isolated switching converter; and a duty cycle control circuit, configured to provide the resistance control signal based on the mode detecting signal; wherein,
the mode detecting signal flips from a first voltage level to a second voltage level when a duty cycle of the switching signal decreases to be lower than a duty cycle threshold; and
the mode detecting signal flips from the second voltage level to the first voltage level when the duty cycle of the switching signal increases to be higher than the duty cycle threshold;
wherein the switching signal is a pulse signal, and the duty cycle is defined as a fraction of an on time period in a switching cycle period of the power block controlled by the switching signal.

9. An isolated switching converter, comprising:
a power block, configured to receive a bus voltage and a switching signal, wherein the power block is controlled to be on and off by the switching signal to deliver an output power to a load, and meanwhile to convert the bus voltage to an output voltage;
a control block, configured to provide the switching signal based on a feedback voltage at the feedback terminal; and
a feedback block configured to provide the feedback voltage, wherein the feedback block comprises:
a variable resistance circuit, coupled between a control voltage supply and the feedback terminal, the variable resistance circuit receiving a resistance control signal and having an equivalent resistance in proportional to a duty cycle of the resistance control signal; and
a resistance control circuit, configured to provide the resistance control signal based on a load of the isolated switching converter; wherein
the duty cycle of the resistance control signal increases gradually from a minimum value to a maximum value after the load of the isolated switching converter decreases to a load threshold; and
the duty cycle of the resistance control signal decreases gradually from the maximum value to the minimum value after the load of the isolated switching converter increases to the load threshold.

10. The isolated switching converter of claim 9, wherein the feedback block further comprising an opto-coupler having:
a photosensitive diode, coupled with a secondary feedback network, wherein the secondary feedback network converts the output voltage to a current flowing through the photosensitive diode; and
a photosensitive transistor, coupled between the feedback terminal and a primary ground reference, the photosensitive transistor providing an optical current to the variable resistance circuit in response to the current flowing through the photosensitive diode.

11. The isolated switching converter of claim 9, wherein the feedback block further comprises:
a filter circuit, coupled between the feedback terminal and a primary ground reference, wherein the filter circuit filters a voltage at the feedback terminal to generate the feedback voltage.

12. A method for controlling a feedback block of an isolated switching converter, wherein the isolated switching converter comprises a control block, and a power block controlled by a switching signal, the method comprising:

providing a resistance control signal with switching cycle periods based on a load of the isolated switching converter;

providing a feedback voltage by flowing an optical current through an variable resistance controlled by the resistance control signal, wherein the optical current is in proportional to the output voltage of the isolated switching converter; wherein the variable resistance increases when a load decreases to be lower than a load threshold and decreases when the load increases to be higher than the load threshold.

13. The method of claim 12, wherein the variable resistance is generated by a variable resistance circuit, and wherein the variable resistance circuit comprises:

a first resistor controlled by the resistance control signal to be serially coupled to a photosensitive transistor providing the optical current; and a second resistor serially coupled to the photosensitive transistor;

wherein a voltage at a connection node of the first resistor, the second resistor and the photosensitive transistor is filtered and is provided as the feedback voltage.

14. The method of claim 12, wherein the variable resistance is generated by a variable resistance circuit, and wherein the variable resistance circuit comprises:

a resistor controlled by the resistance control signal to be serially coupled to a photosensitive transistor providing the optical current;

wherein a voltage at a connection node of the resistor and the photosensitive transistor is filtered and is provided as the feedback voltage.

15. The method of claim 12, wherein the variable resistance is generated by a variable resistance circuit, and wherein the variable resistance circuit comprises:

a first resistor controlled by a resistance control signal to be serially coupled to a photosensitive transistor providing the optical current; and a second resistor controlled by a reversed signal of the resistance control signal to be serially coupled to the photosensitive transistor;

wherein a voltage at a connection node of the first resistor, the second resistor and the photosensitive transistor is filtered and is provided as the feedback voltage.

16. The method of claim 12, wherein providing the resistance control signal based on the load of the isolated switching converter comprises:

determining the load of the isolated switching converter by detecting the switching signal;

increasing a duty cycle of the resistance control signal gradually after the load decreases to be lower than the load threshold; and decreasing the duty cycle of the resistance control signal gradually after the load increases to be higher than the load threshold;

wherein the variable resistance is in proportional to the duty cycle of the resistance control signal.

17. The method of claim 16, wherein detecting the switching signal comprises:

detecting a burst duty cycle of the switching signal, wherein the burst duty cycle is defined as a ratio of an active time period to a sum of the active time period and a adjacent non-active time period of the switching signal.

18. The method of claim 16, wherein detecting the switching signal comprises:

detecting a duty cycle of the switching signal, wherein the duty cycle of the switching signal is defined as a fraction of an on time period in a switching cycle period of the switching signal.

\* \* \* \* \*